(12) United States Patent
Yang et al.

(10) Patent No.: US 6,418,002 B1
(45) Date of Patent: Jul. 9, 2002

(54) POWER SUPPLY SUPERVISOR HAVING A LINE VOLTAGE DETECTOR

(75) Inventors: Ta-yung Yang, Taoyuan; Jenn-yu G. Lin; Rui-hong Lu, both of Taipei, all of (TW)

(73) Assignee: System General Corp., Milpitas, CA (US)

( * ) Notice: Subject to any disclaimer, the term of this patent is extended or adjusted under 35 U.S.C. 154(b) by 0 days.

(21) Appl. No.: 09/607,029

(22) Filed: Jun. 29, 2000

(51) Int. Cl.[7] ................................................. H02H 3/00
(52) U.S. Cl. ............................. 361/90; 361/18; 361/78; 361/92
(58) Field of Search ........................... 361/90, 18, 78, 361/92, 115, 79

(56) References Cited

U.S. PATENT DOCUMENTS

| | | | |
|---|---|---|---|
| 4,803,592 A | * 2/1989 | Ashley | 361/79 |
| 5,224,010 A | 6/1993 | Tran et al. | 361/90 |
| 5,636,109 A | 6/1997 | Carroll | 363/21 |

* cited by examiner

Primary Examiner—Stephen W. Jackson
(74) Attorney, Agent, or Firm—J. C. Patents (57) ABSTRACT

A power supply supervisor having a line voltage detector is used to monitor a power supply. A peak detector detects the line voltage by measuring the PWM switching signal in the secondary of the transformer. A logic circuit couples to the peak detector and the under-voltage detector, etc. to generate a power good (PG) signal when the power supply outputs meet the specifications. The logic circuit outputs a FAIL signal to turn off the power supply when an abnormal situation, such as over-voltage, occurs. Furthermore, when AC power is lost or turned off, the logic circuit detects a low line voltage and generates a power-down-warning PG signal before the output voltages are disabled. When an abnormal situation occurs before the low line voltage is detected, the logic circuit latches the power supply in a power off state. If the abnormal situation occurs after the low line voltage is detected, the logic circuit turns off the power outputs, but disables the latch function. In the meantime, a time delay circuit is applied to postpone the power off status, in which the time delay limits the duty cycle of power outputs and protects the power supply from over-stress damage.

3 Claims, 8 Drawing Sheets

POWER SUPPLY SUPERVISOR HAVING A LINE VOLTAGE DETECTOR

BACKGROUND OF THE INVENTION

1. Field of Invention

The present invention relates to a power supply. More particularly, the present invention relates to a power supply supervisor and protection circuit.

2. Description of Related Art

Figure 1:
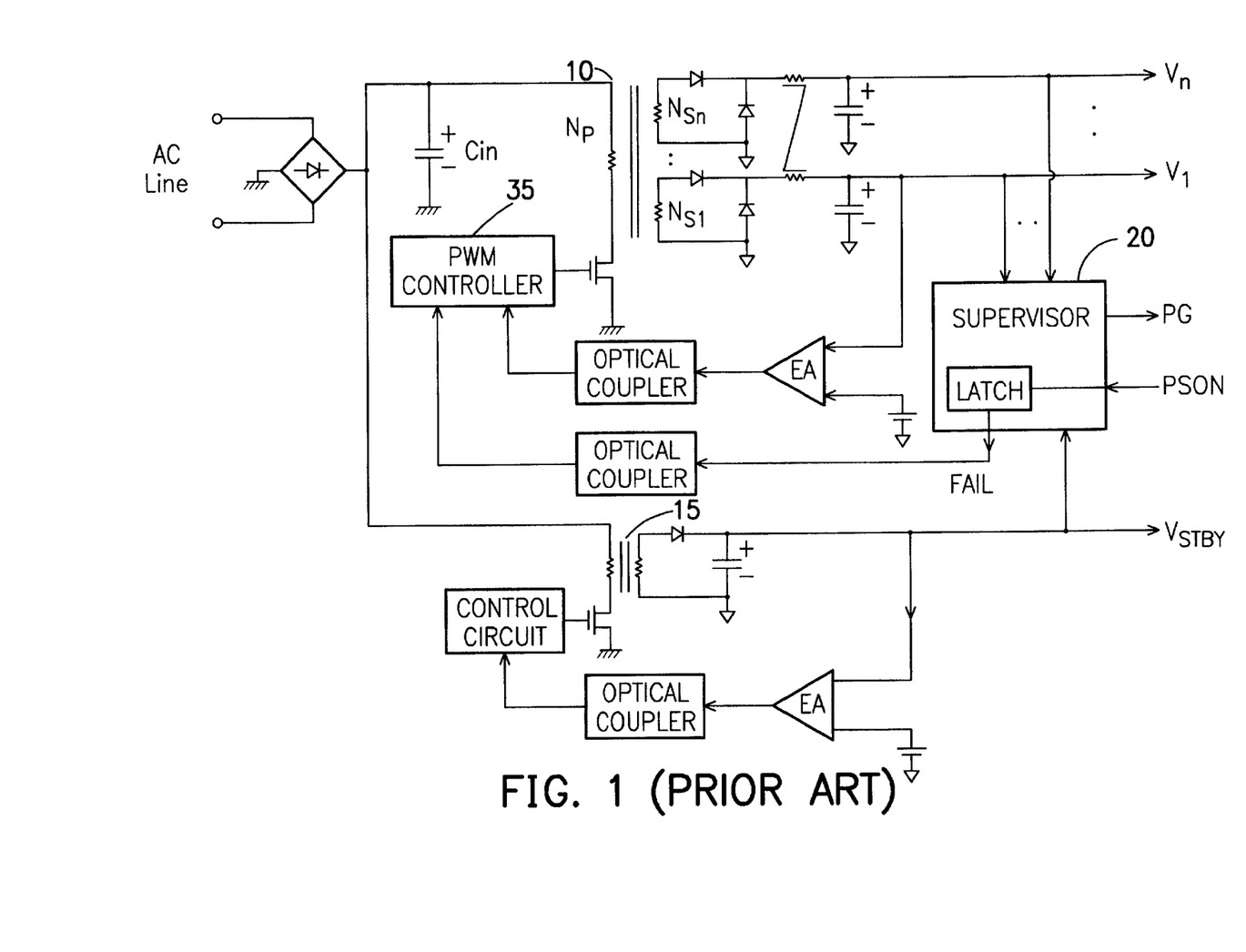
FIG. 1 shows a circuit of a power supply having a conventional power management function.

At present, the power supply for a personal computer (PC) is required to have a power management function to save energy. FIG. 1 shows circuits of a power supply having a conventional power management function. The power supply has a transformer 10 that provides multiple output voltages $V_1, \ldots, V_n$, such as a 3.3V, 5V, 12V, and −12V, for a variety of applications. A power supply supervisor 20 controls the output of the multiple output voltages $V1, \ldots, Vn$. The supervisor receives a control signal PSON from a CPU (central processor unit) of the computer to activate the output of the transformer 10. In other words, the control signal PSON is applied to turn off the power supply when the CPU enters into a sleep mode.

While the computer system is in the sleep mode, the transformer 15 provides a low stand-by power. When the computer is woken up, such as by triggering a keyboard of the computer system, the control signal PSON is set to the ON-state for activating the transformer 10 to output the multiple output voltages $V_1, \ldots, V_n$. When the multiple output voltages $V_1, \ldots, V_n$, reach the specified levels, a power good (PG) signal is sent by the supervisor 20 to the CPU, commanding the CPU to initiate input/output-accessing tasks.

The supervisor also includes protection functions, such as over-voltage protection and over current protection, for protecting the power supply and the circuit connected to the power supply. When abnormal situations occur, the supervisor 20 outputs a FAIL signal to inactivate the transformer 10 and stop output of the multiple output voltages $V1, \ldots, Vn$, which avoids the permanent damage of the power supply and protect the connected circuits.

There are two types of protection circuits for the power supply: latch type and non-latch type. With regard to the latch type, the power supply remains in an off state even when the abnormal situation disappears. To restart the power, a reset procedure is necessary, for example, turning off the power supply to reset the latch and then turning on the power supply again.

However, the latch type power supply has the following defects. Reference is made to FIG. 1. When AC power is switched off, abnormal power supply situations may occur simultaneously, such as over-power, etc., which cause the supervisor 20 to disable the voltage outputs and latch the power supply to an off state. Since the power of supervisor 20 is supplied by the stand-by power through the transformer 15, the power supply is latched in the off state as long as the standby power exists. Since the power supply is latched in an off state, the transformer 10 is inactivated, therefore no energy is delivered from capacitor Cin to the transformer 10. The rest of the energy stored in capacitor Cin, providing the power for supervisor 20, can last several seconds. Accordingly, the power supply can only be switched on until the output of the standby power is exhausted. Otherwise, the power supply cannot be turned on because the latched status remains. When the computer is switched off and cannot be switched on again, the user may think that the power supply or the computer is damaged. To solve this problem, a dummy load is added to the output of the stand-by power to speed up the discharge of capacitor Cin. However, the dummy load increases power consumption and does not meet the power saving requirement.

Figure 2:
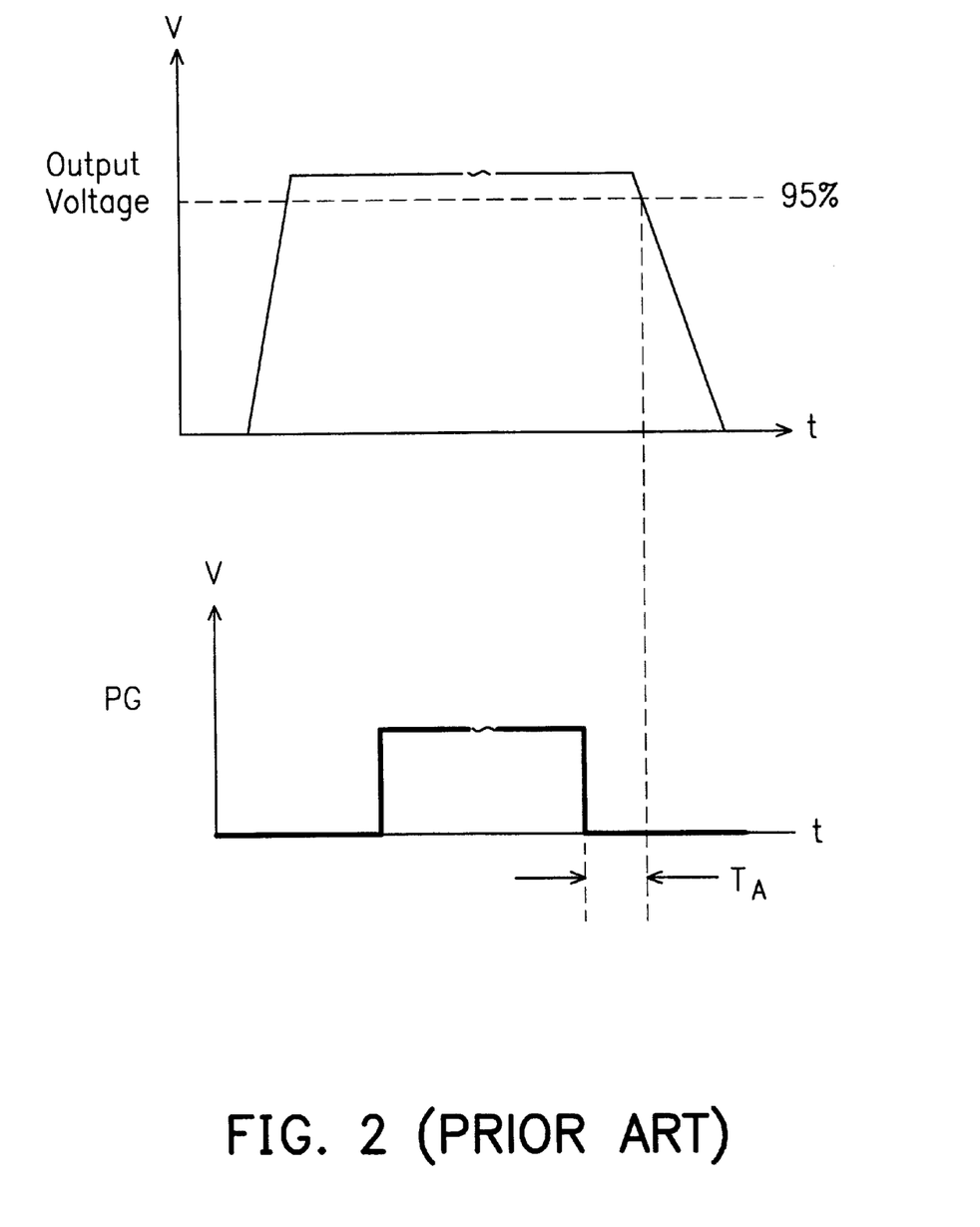
FIG. 2 shows a timing diagram of the power-down-warning PG signal.
Figure 3:
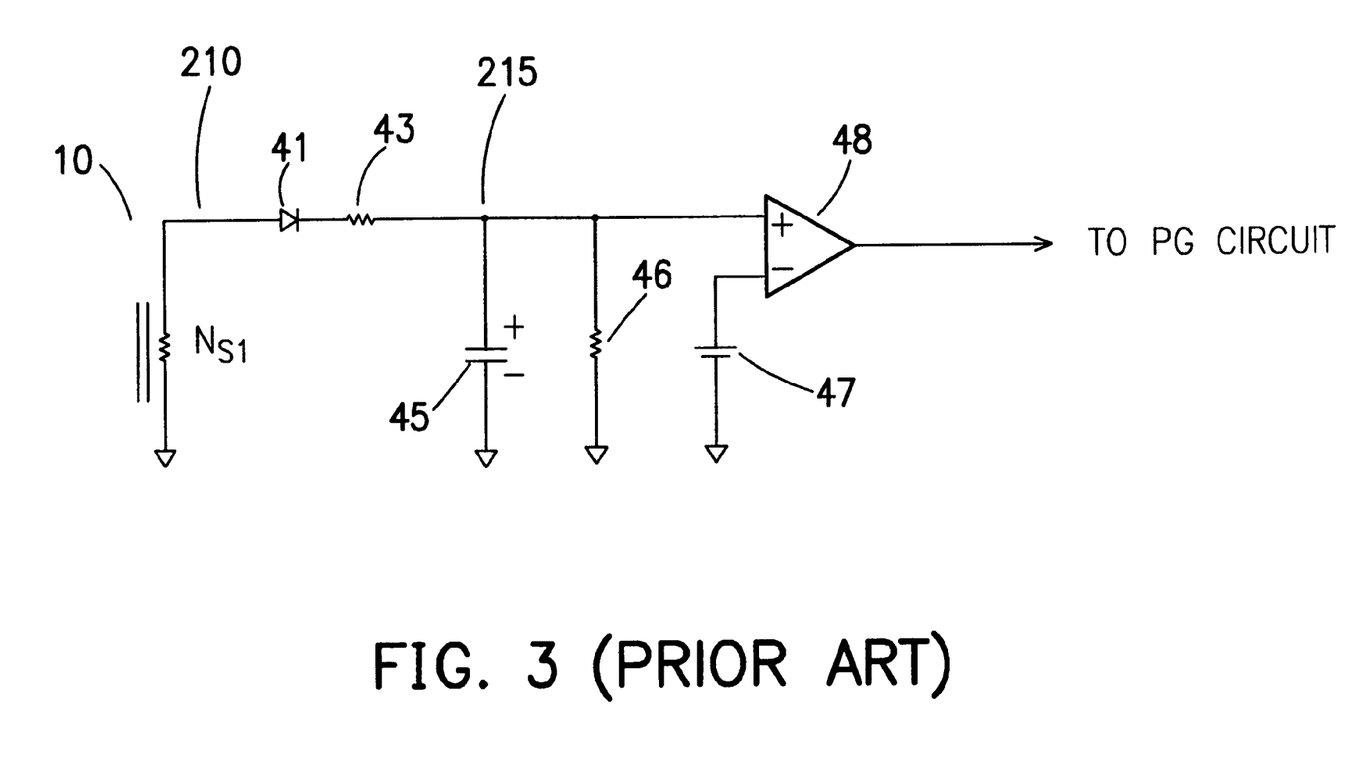
FIG. 3 shows a circuit for generating a power-down-warning PG signal according to the conventional method.
Figure 4:
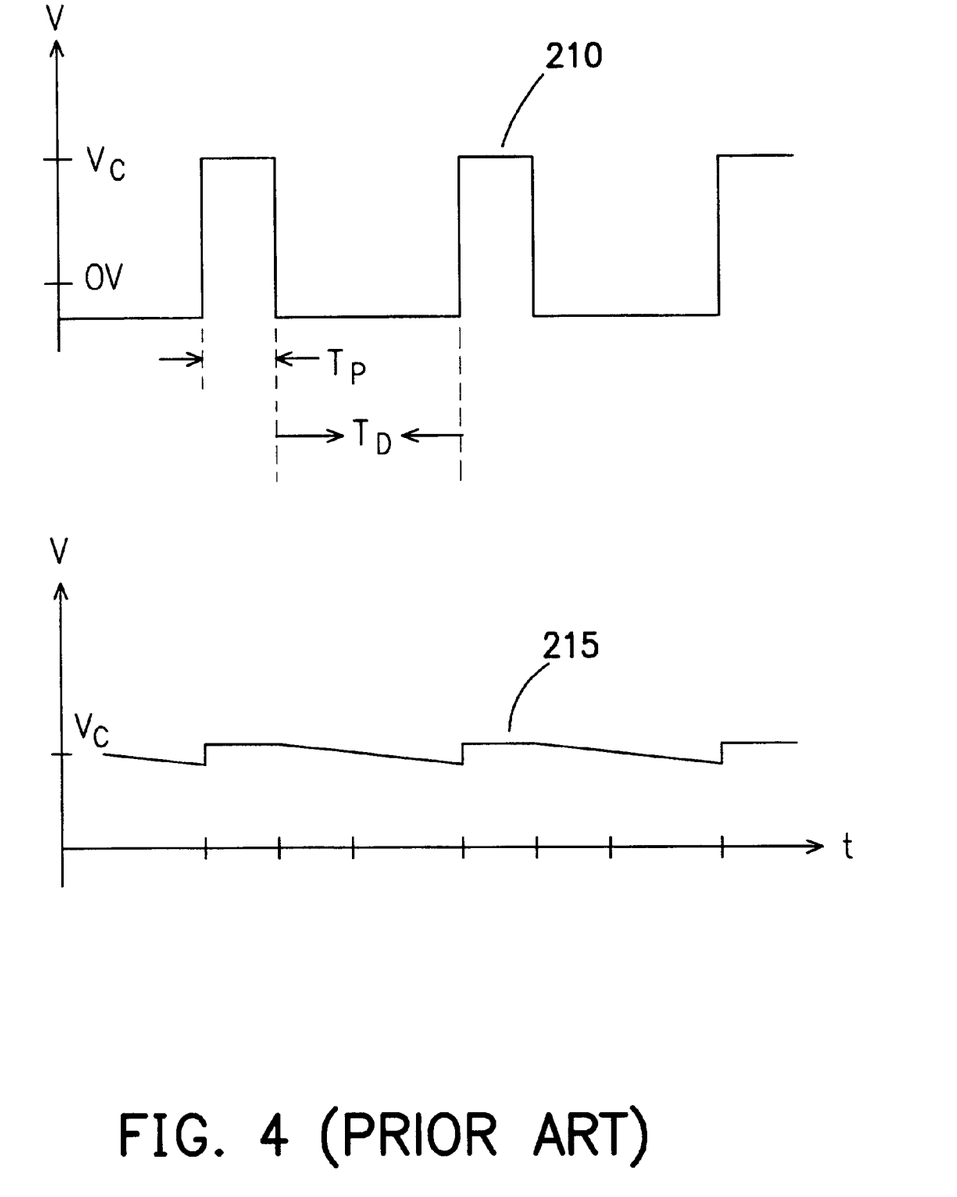
FIG. 4 shows the voltage waveforms of the circuit in FIG. 3.

Additionally, for stopping the access of flash-memory, disk driver, etc., a power-down-warning PG signal is required to inform the CPU that an AC that an AC power loss or AC power off occurred before the output voltages of the power supply are disabled. As shown in FIG. 2, the power-down-warning time $T_A$ is specified to meet the requirement. As shown in FIG. 3, a circuit for generating the power-down-warning PG signal is used according to the conventional method. FIG. 4 shows the voltage waveforms of FIG. 3. The pulse width of the PWM switching signal is controlled by the power supply for generating regulated outputs. The line voltage of the AC power determines the amplitude of the PWM switching signal. According to the turn ratio of the transformer 10, as shown in FIG. 3, the amplitude of the PWM switching signal 210 in the secondary is proportional to the line voltage in the primary. The conventional circuit shown in FIG. 3 is typically a rectification and filter circuit. If the resistance of the resistor 46 or the capacitance of the capacitor 46 is smaller, the discharge time will shorter, and the comparator 48 may incorrectly verify that a low line voltage is detected and generate an incorrect PG signal. If a larger resistance of the resistor 46 or a larger capacitance of the capacitor 46 is used, the discharge time is longer. The circuit of FIG. 3 may not generate a power-down-warning PG signal in time when AC power is lost or turned off.

SUMMARY OF THE INVENTION

The invention provides a power supply supervisor having a line voltage detector. The power supply supervisor comprises a peak detector, a time delay circuit and a logic circuit, which associate with the under-voltage detector, the over-voltage detector and the over-power detector to monitor the power supply.

The peak detector detects the line voltage by measuring the PWM switching signal in the secondary of the transformer and generating control signals. The under-voltage detector detects the levels of the output voltages. The over-voltage detector detects the levels of the output voltages that exceed the specified high level. The over-power detector monitors the output powers. The logic circuit couples to the peak detector, the under-voltage detector, the over-voltage detector. and the over-power detector, to generate a PG signal when the power supply outputs meet the specifications. The logic circuit outputs a FAIL signal to turn off the power supply when an abnormal situation such as over-voltage or over-power occurs. Furthermore. when AC power is lost or turned off, the logic circuit detects a low line voltage via the peak detector and generate a power-down-warning PG signal before the output voltages are disabled.

When an abnormal situation occurs before the low line voltage is detected, the logic circuit latches the power supply in an off state by latching the FAIL signal. If the abnormal situation occurs after the low line voltage is detected, the logic circuit turns off the power outputs by enabling the FAIL signal, but disables the latch function. In the mean time, a time delay circuit is applied to postpone the power off state, in which the time delay limits the duty cycle of power output and protects the power supply from over-stress damage.

The peak detector mentioned above may further comprises a maximum voltage detector for periodically sampling the amplitude of the PWM switching signal; a width detector for detecting the minimum pulse width of the PWM switching signal; a sample-comparator coupling to the maximum voltage detector and the width detector for immediately generating the control signal after the low line voltage is detected, thereby activates the power-down-warning PG signal.

Advantageously, the power supply supervisor having a line voltage detector of the present invention can provide a sufficient period of time for the power-down-warning PG signal before the output voltages of the power supply are disabled. In addition, the latch function of the power supply is disabled when the AC power is switched off. By this invention, the power supply can be switched on/off rapidly.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 5:
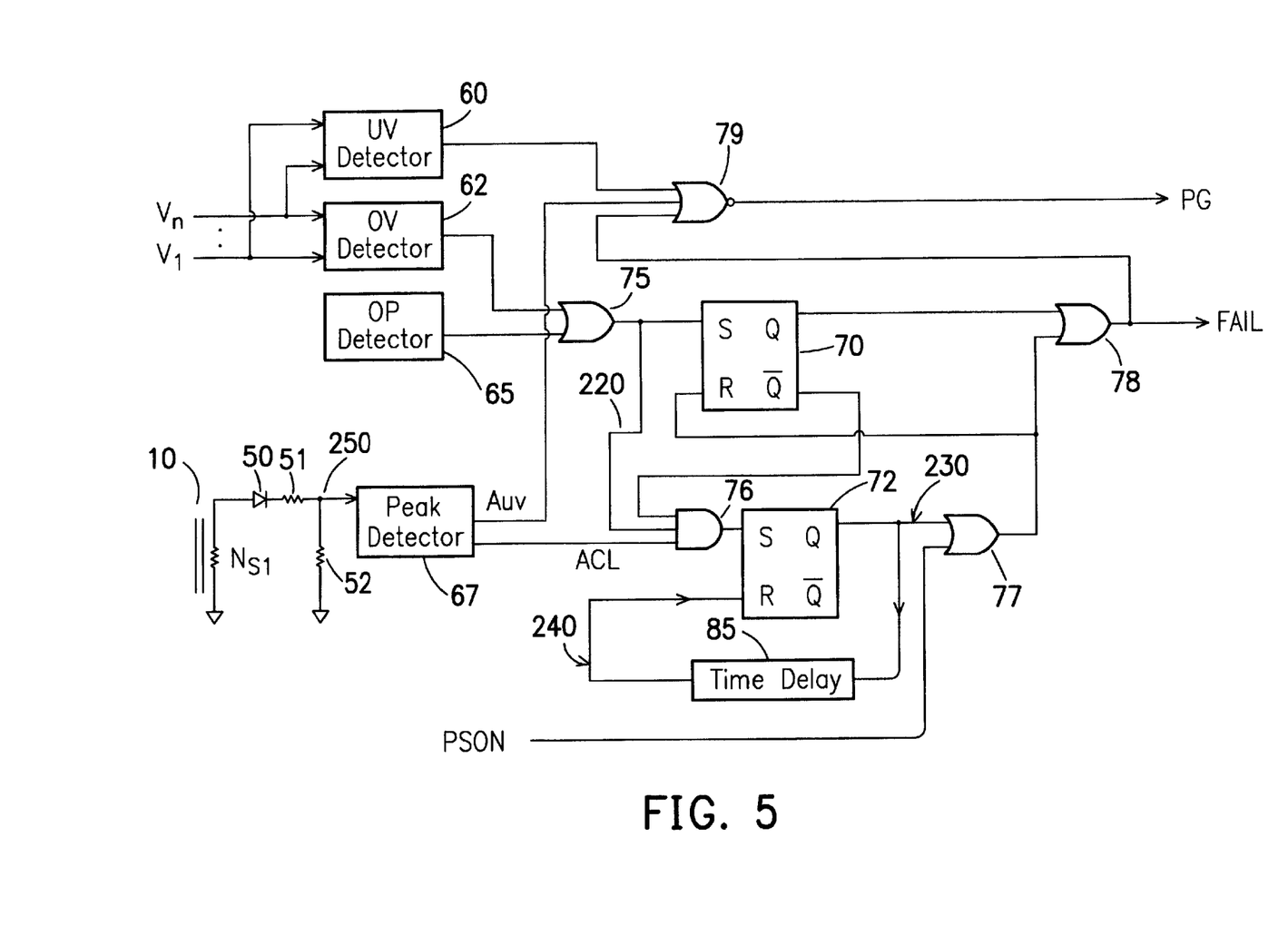
FIG. 5 schematically illustrates a block diagram of a power supply supervisor having a line voltage detector according to one embodiment of the present invention.

FIG. 5 schematically illustrates a block diagram of a power supply supervisor having a line voltage detector according to one embodiment of the present invention. Referring to FIG. 5, the power supply supervisor essentially comprises a peak detector 67, a time delay circuit 85, and a logic circuit including flip-flops 70. 72 and logic gates 75, 76, 77, 78, 79, which associate with an under-voltage detector 60, an over-voltage detector 62 and an over-power detector 62 for monitoring the power supply.

The under-voltage detector 60 and the over-voltage detector 62 receive the multiple output voltage $V_1, \ldots, V_n$, and detect whether these output voltages $V_1, \ldots, V_n$, are under or over specified voltages. The over-power detector 65 detects if the output power exceeds the limited value. The peak detector 67 receives a line voltage from the secondary of a transformer 10 through a voltage divider circuit consisting of resistors 51 and 52.

The logic gate 79, such as a NOR gate, receives the output signals of the under-voltage detector 60, peak detector 67 and a FAIL signal from the logic gate 78 for generating a PG signal. The logic gate 75, such as an OR gate, receives the output signals of the over-voltage detector 62 and the over-power detector 65 and outputs to the set terminal of the flip-flop 70. The logic gate 78, such as an OR gate, receives the out signal of the flip-flop 70 and the output signal of the logic gate 77 to generate the FAIL signal for disabling the power output.

The logic gate 76, such as a AND gate, receives signals from the ACL output of the peak detector 67, the output of the logic gate 75, and the complementary output of the flip-flop 70. The output of the logic gate 76 is connected to the set terminal of the flip-flop 72. The logic gate 77, such as a OR gate, receives the output signal of the flip-flop 72 and a control signal PSON and then outputs to the logic gate 78 and the reset terminal of the flip-flop 70. The output signal of the flip-flop 72 is further fed back to the reset terminal of the flip-flop 72 through a time delay circuit 85.

Figure 6:
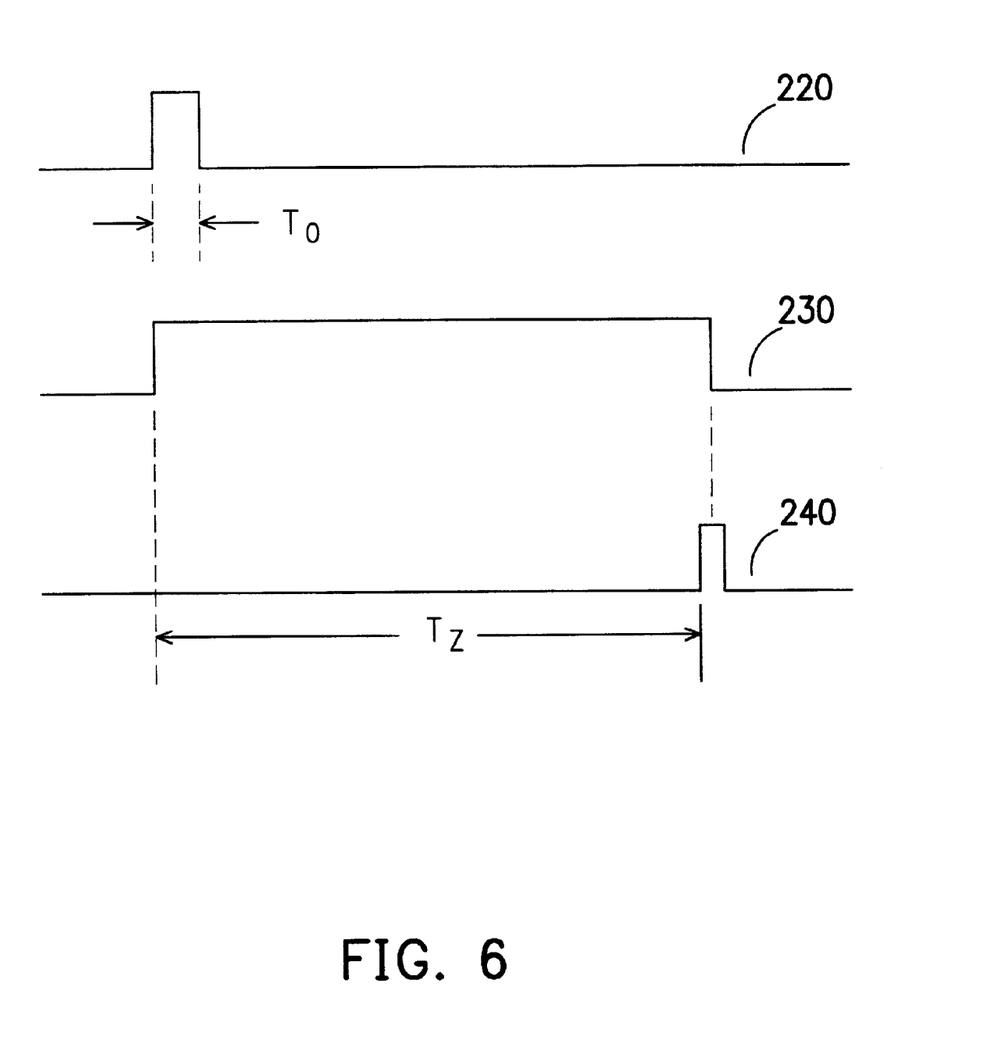
FIG. 6 shows the operation of the time delay circuit in FIG. 5.

The operation of the power supply supervisor having a line voltage detector is further discussed in detail in accordance with FIGS. 5 and 6.

The peak detector 67 is used for detecting variations of the line voltage within a short time. The resistors 51 and 52 serve as the voltage divider for generating a suitable voltage level at node 250 and then inputting to the peak detector 67. When the AC power is turned off. the peak detector can detect a low line voltage and generate a logic high signal at Auv output, and then commands the gate 79 to activate a power-down-warning PG signal.

The power supply supervisor of the present invention can monitor abnormal situations during the operation of the power supply. Situations like over voltage, over current or over power can be detected by the over-voltage detector 62 and over-power detector 65. The logic gate 75 receives the output signals of the over-voltage detector 62 and the over-power detector 65 to generate a signal 220 indicating that an abnormal situation hasoccurred. The flip-flop 70, such as an S-R flip-flop, receives the signal 220 and then outputs to the logic gate 78 along with the output of the gate 77 to generate the FAIL signal to disable the power outputs. Namely, the flip-flop 70 serves as a latch for suspending the power output.

The peak detector 67 detects the low line voltage and generates the ACL signal used for disabling the latch function and enabling the time delay circuit. The ACL signal is sent to the flip-flop 72 through the gate 76. The output of the flip-flop 72 along with the PSON signal is sent to the gate 77. Thereafter, the gate 78 combines the output of the flip-flop 70 and the output of the gate 77 for generating the FAIL signal to disable the power output.

When an abnormal situation occurs (signal 220 active high) before the low line voltage is detected (ACL signal active high), the output of the flip-flop 70 and the FAIL signal is latched, and the complementary output of the flip-flop 70 is set to low to inhibit the gate 76. If the abnormal situation occurs after the low line voltage is detected, the gate 76 is enabled to set the output of the flip-flop 72 and activates the FAIL signal. Meanwhile, the output of the gate 77 resets the flip-flop 70 to disable the latch function and the output of the flip-flop 72 enables the time delay circuit 85 to postpone the power off status.

FIG. 5 schematically illustrates a block diagram of a power supply supervisor having a line voltage detector according to one embodiment of the present invention. refering to FIG. 5, the power supply supervisor essentialy comprises a peak dectector 67, a time delay circuit 85, and a logic circuit including flip-flops; 70, 72 and logic gates 75, 76, 77, 78, 79, which associate whith an under-voltage detector 60, and over-voltage detector 62 and an over-power dectector 65 for monitoring the power supply.

FIG. 6 shows the operation of the time delay circuit 85. As shown in FIG. 5, the output signal of the flip-flop 72 is further fedback to the reset terminal of the flip-flop 72 through the time delay circuit 85. For example, if the delay time defined by the time delay circuit 85 is Tz, the output signal of the flip-flop 72 is delayed by a time interval of Tz and then inputted to the reset terminal of the flip-flop 72 for resetting the flip-flop 72. Referring to FIG. 6, the operation of the time delay circuit 85 is as follows. When the signal inputted to the time delay circuit 85 is transient from a low-level state to a high-level state, the output signal of the time delay circuit is transient to a high-level state with a delay time Tz. The output signal of the time delay circuit is immediately transient to a low-level state while the signal inputted to the time delay circuit 85 is transient from a high-level state to a low-level state. A suitable value of the delay time Tz can be chosen, such as 0.5 second or 1 second.

Figure 7:
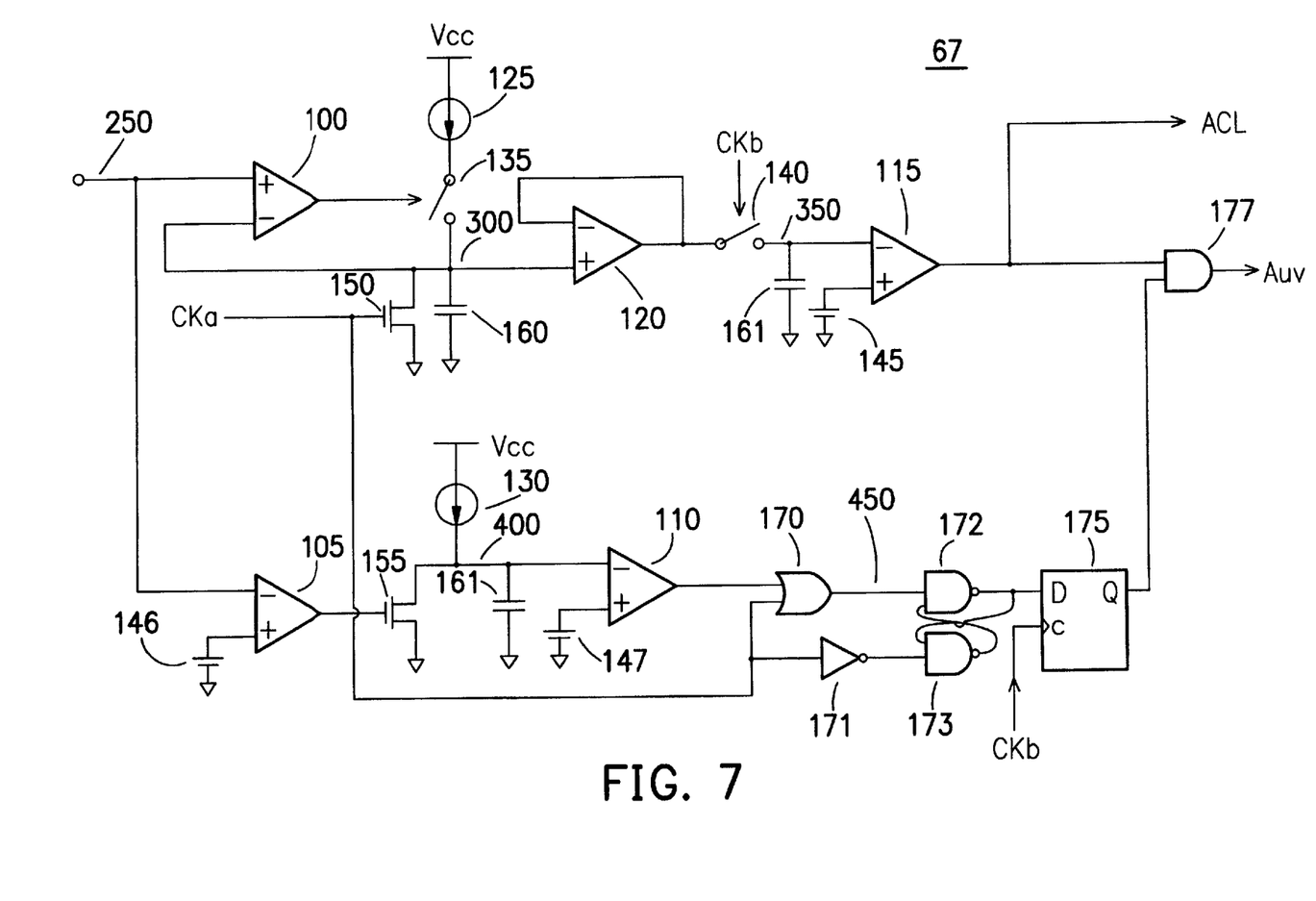
FIG. 7 schematically illustrates an exemplary circuit diagram of the peak detector in FIG. 5.

FIG. 7 schematically illustrates an exemplary circuit diagram of the peak detector 67 shown in FIG. 5. It should be noted that the circuit shown in FIG. 7 is only an exemplary circuit and does not limit the scope of the present invention. Other suitable designs for achieving the same functions can be embodied.

The peak detector 67 comprises a maximum voltage detector, a sample-comparator, a width detector and a pulse-lock circuit.

Figure 8:
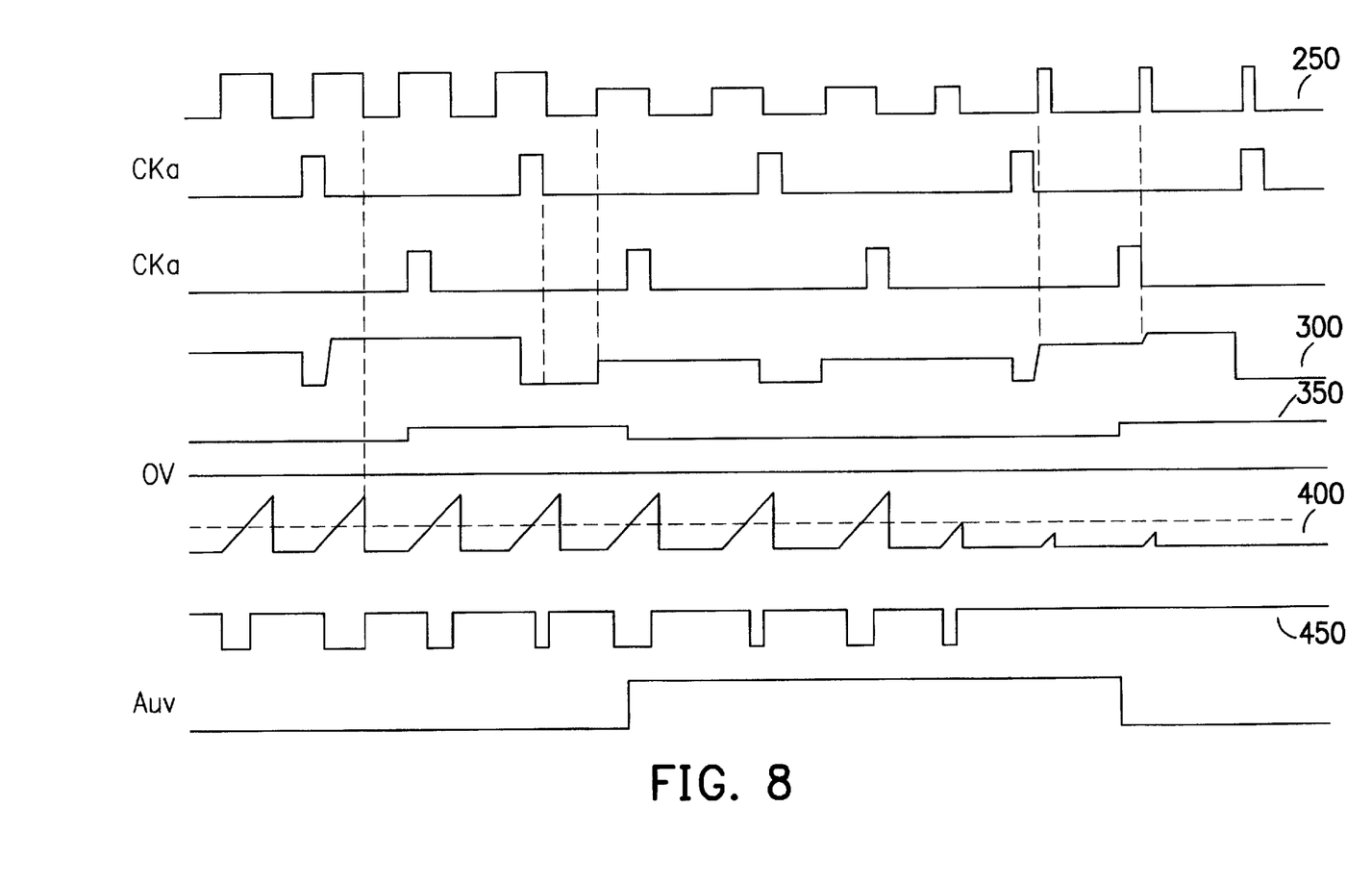
FIG. 8 shows a timing diagram for describing the operation of the peak detector in FIG. 7.

The maximum voltage detector comprises a comparator 100, a current source 125, an analog switch 135, a transistor 150, and a capacitor 160. The comparator 100 receives the PWM switching signal at node 250, from the secondary of the transformer 10 (see FIG. 5), and compares the switching signal with a sampled signal 300 in the capacitor 160. A clock signal Cka is input into the gate of the transistor 150 for periodically sampling the PWM switching signal. The output of the comparator 100 controls the on/off of the analog Switch 135 for enabling/disabling the current source 125, in which the current source 125 charges the capacitor 160. The voltage waveform of the sampled signal 300 is shown in FIG. 8.

The capacitor 160 is then connected to the sample-comparator for generating control signals ACL and Auv. The sample-comparator comprises an op-amplifier 120, an analog switch 140, a capacitor 161, a reference voltage 145, a comparator 115 and a logic gate 177. The analog switch 140 is driven by a clock signal Ckb, which is synchronized with the clock signal Cka, but interleaved to the clock Cka. The sampled signal 300 is rail-to-rail buffered by the op-amplifier 120 and then transmitted to the capacitor 161 when the analog switch 140 is closed. The voltage waveform of a signal 350 in the capacitor 161 is shown in FIG. 8. If the voltage of the signal 350 is lower than the reference voltage 145, the comparator 115 outputs a logic high control signal ACL. The AND gate 177 is used for generating the control signal Auv by combining the output of the comparator 1 15 and the output of the flip-flop 175.

The values of the current source 125 and the capacitor 160 are determined by the sampling rate and the ability of eliminating noise. Assuming that the voltage of the capacitor 160 is V160, the current of the current source 125 is I125 and the capacitance of the capacitor 160 is C160, then C160 * V160=I125 * Ts. The charge time Ts=C160 *V160/I125. Accordingly, if a small value of Ts is chosen a fast sampling rate is obtained, and if larger Ts are chosen the ability to eliminate noise increases.

The width detector comprises a comparator 105, a transistor 155, a current source 130, a capacitor 161, a comparator 110 and reference voltages 146, 147. The width detector detects a minimum pulse width of the PWM switching signal. The pulse-lock circuit receives the output signal of the width detector and then sets the output of a flip-flop 175 as low when the pulse width is less than a predetermined width (see voltage waveform 400 shown in FIG. 8). Then, the control signal Auv is set to low through the gate 177. The pulse-lock circuit comprises an OR gate 170, an inverter 171, NAND gates 172, 173 and the flip-flop 175.

If the pulse width of the PWM switching signal at the node 250 is too narrow, the sampled voltage by the peak detector 67 may become incorrect (a lower voltage may be sampled). Furthermore, the narrower pulse width of the PWM switching signal only occurs in the situation where the inputted AC line voltage is in a high value.

Therefore, when the pulse width of the PWM switching signal is too narrow, the peak detector 67 does not drive the PG signal for insuring that the power supply functions normally.

Therefore, the power supply supervisor having a line voltage detector of the present invention can provide a sufficient period of time for the power-down-warning PG signal before the output voltages of the power supply are disabled. In addition, the latch function of the power supply is disabled when the AC power is switched off. Accordingly, the power supply can be switched on/off rapidly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply supervisor having a line voltage detector for monitoring a power supply, the power supply supervisor comprising:

a peak detector for detecting the line voltage and generating control signals, wherein the peak detector detects a line voltage by measuring a PWM switching signal in the secondary of a transformer;

a logic circuit coupled to the peak detector, an under-voltage detector, a over-voltage detector and an over-power detector, for generating a power good (PG) signal or a fail signal, wherein the logic circuit latches the power supply in a power off state by latching the fail signal when an abnormal situation occurs before a low line voltage is detected, and wherein the logic circuit outputs the fail signal without the latch to turn off the power supply when an abnormal situation occurs after the low line voltage is detected; and a time delay circuit coupled to the logic circuit for postponing the power off state and limiting the duty cycle of power outputs, in which the logic circuit outputs the fail signal without the latch.

2. The power supply supervisor of claim 1, wherein the peak detector further comprises:

a maximum voltage detector for periodically sampling the amplitude of the PWM switching signal;

a width detector for detecting a minimum pulse width of the PWM switching signal, wherein the width detector inhibits a drive of the PG signal when a pulse width of the PWM switching signal is shorter than the minimum pulse width;

a pulse-lock circuit coupled to the output of the width detector; and a sample-comparator for connecting to an output of the maximum voltage detector and the pulse-lock circuit to generate the control signal, thereby activating a power-down-warning PG signal.

3. A peak detector used for a power supply supervisor, comprising:

a maximum voltage detector for periodically sampling an amplitude of a PWM switching signal;

a width detector for detecting a minimum pulse width of the PWM switching signal;

a pulse-lock circuit coupled to an output of the width detector; and a sample-comparator for connecting to the output of the maximum voltage detector and the pulse-lock circuit to generate a control signal, thereby activating a power-down-warning PG signal.

* * * * *